(12) United States Patent
Plöchinger

(10) Patent No.: US 10,436,665 B2
(45) Date of Patent: Oct. 8, 2019

(54) FLUID PROPERTY SENSOR WITH HEAT LOSS COMPENSATION AND OPERATING METHOD THEREOF

(71) Applicant: Heinz Plöchinger, Freinberg (AT)

(72) Inventor: Heinz Plöchinger, Freinberg (AT)

( * ) Notice: Subject to any disclaimer, the term of this patent is extended or adjusted under 35 U.S.C. 154(b) by 268 days.

(21) Appl. No.: 15/610,878

(22) Filed: Jun. 1, 2017

(65) Prior Publication Data

US 2018/0348077 A1    Dec. 6, 2018

(51) Int. Cl.
| | | |
|---|---|---|
| *G01F 1/696* | (2006.01) | |
| *G01L 21/12* | (2006.01) | |
| *G01F 1/698* | (2006.01) | |
| *G01F 1/69* | (2006.01) | |
| *G01F 25/00* | (2006.01) | |
| *G01L 27/00* | (2006.01) | |

(52) U.S. Cl.
CPC .......... *G01L 21/12* (2013.01); *G01F 1/69* (2013.01); *G01F 1/698* (2013.01); *G01F 1/6965* (2013.01); *G01F 25/0053* (2013.01); *G01L 27/002* (2013.01)

(58) Field of Classification Search
CPC ......... G01L 21/12; G01L 27/002; G01F 1/69; G01F 1/6965; G01F 25/0053
USPC ....... 73/1.02, 1.06, 1.16, 861.02, 1.57, 1.58, 73/25.01, 25.03–25.05, 32 R, 54.42, 73/54.43, 61.46, 202.5, 204.11–204.27, 73/700, 753

See application file for complete search history.

(56) References Cited

U.S. PATENT DOCUMENTS

| | | |
|---|---|---|
| 1,993,063 A | 3/1935 | Klopsteg |
| 5,351,551 A | 10/1994 | Drubetsky et al. |
| 5,597,957 A | 1/1997 | Schieferdecker et al. |
| 6,023,979 A | 2/2000 | Bills |

(Continued)

FOREIGN PATENT DOCUMENTS

| | | |
|---|---|---|
| DE | 19903010 | 8/2000 |
| EP | 0660096 A2 | 6/1995 |

(Continued)

OTHER PUBLICATIONS

Gyungtae Kim, Changho Seok, Taehyun Kim, Jae Hong Park, Heeyeoun Kim and Hyoungho Ko, The Micro Pirani Gauge with Low Noise CDS-CTIA for In-Situ Vacuum Monitoring, Journal of Semiconductor Technology and Science, vol. 14, No. 6, Dec. 2014.

(Continued)

*Primary Examiner* — Robert R Raevis
(74) *Attorney, Agent, or Firm* — Smartpat PLC

(57) ABSTRACT

A method comprises suspending a measuring element within a fluid and applying measuring power to the measuring element. Radiation loss compensation power is applied to a heating element. The radiation loss compensation power is selected to compensate parasitic radiative heat loss from the measuring element. Heat transfer from the measuring element into the fluid is evaluated and a property of the fluid is derived. A sensor which implements the method uses a resistive measuring element which is electrically connected to an evaluation circuit. The heating element is electrically connected to a power source. A processor receives an input from the evaluation circuit and calculates a property of the fluid while the power source provides radiation loss compensation power to the first heating element.

18 Claims, 6 Drawing Sheets

(56) References Cited

U.S. PATENT DOCUMENTS

| | | | |
|---|---|---|---|
| 7,360,415 B2 | 4/2008 | Nakano et al. | |
| 7,497,118 B2 | 3/2009 | Ploechinger | |
| 7,642,923 B2 | 1/2010 | Ploechinger | |
| 8,047,711 B2 | 11/2011 | Ploechinger | |
| 8,449,177 B2 | 5/2013 | Kvisteroy et al. | |
| 9,606,074 B2 * | 3/2017 | Plochinger | G01N 25/18 |
| 2014/0026640 A1 * | 1/2014 | Plochinger | G01N 25/18 73/25.03 |
| 2015/0276536 A1 | 10/2015 | Gu et al. | |
| 2017/0167938 A1 * | 6/2017 | Plochinger | G01L 21/12 |

FOREIGN PATENT DOCUMENTS

| | | |
|---|---|---|
| JP | 402082145 | 3/1990 |
| JP | H0282145 A | 3/1990 |
| WO | 2002/079729 A1 | 10/2002 |

OTHER PUBLICATIONS

Heinz Plöchinger, 2002, "Fortschritt in der Vakuum-Messtechnik", Vakuum in Forschung und Praxis, vol. 14, No. 5, pp. 281-283.
Paul Dozoretz, Chris Stone, Ole Wenzel, Shrinking the Pirani Vacuum Gauge, Sensors, Jan. 2005.
W. Jitschin & S. Ludwig, 2004, "Dynamical behaviour of the Piranisensor", Vacuum, vol. 75, pp. 169-176.

* cited by examiner

PRIOR ART

PRIOR ART

FLUID PROPERTY SENSOR WITH HEAT LOSS COMPENSATION AND OPERATING METHOD THEREOF

TECHNICAL FIELD

The present disclosure generally relates to thermal sensors for measuring fluid properties, and more particularly, to Pirani sensors for measuring gas pressure.

BACKGROUND

A Pirani sensor uses a measuring element suspended in a tube which is connected to the system whose vacuum is to be measured. The measuring element is typically a heated metal wire (also called a filament). A filament suspended in a gas will lose heat to the gas as the gas's molecules collide with the wire and remove heat. If the gas pressure is reduced the number of molecules present will fall proportionately and the wire will lose heat more slowly. Measuring the heat loss is an indirect indication of pressure. The filament is connected to an electrical circuit from which, after calibration, a pressure reading may be taken.

Exemplary Pirani sensors are disclosed in German patent no. DE19903010 and in European patents No. EP0660096 and EP1409963. Further exemplary sensors and their operating modes are disclosed in U.S. Pat. Nos. 7,360,415; 7,497,118; 7,642,923 and 8,047,711 which are hereby incorporated herein by reference in their entireties.

While the heat loss from the filament into the gas is an indicator of the gas pressure, conventional Pirani sensors also experience conductive heat loss from the filament into the filament's suspension and radiation heat losses from the filament. During operation, the conductive heat loss into the suspension ($P_{suspension}$) and radiation heat loss ($P_{radiation}$) add up to a base power $P_{zero}$ which is required to maintain the operating condition of the sensor. This base power may also be referred to as "zero pressure" $p_0$, indicating the pressure that would lead to the same heat loss into the gas as the parasitic effects of conductive and radiation heat loss in a complete vacuum.

The base power $P_{zero}$ of a Pirani sensor depends on the sensor's geometry, material properties, and environmental conditions in which the sensor operates, especially the ambient temperature. The material properties that affect base power include the emission coefficient of the measuring element (filament) surface and reflection properties of the surface into which power is transferred by radiation. While the influence of the geometry, for example the thickness of the heat dissipating suspension pins, and the influence of the material properties may be assumed to be design related constants, the influence of the ambient temperature is variable.

The greater the amount of parasitic heat losses and therefore the base power $P_{zero}$, the more difficult the detection of small changes in the thermal conductivity, heat capacity, pressure or flow of the measured fluid becomes.

Goal in the design of such sensors is therefore a minimization of base power $P_{zero}$. For reasons of mechanical stability, however, there is a tight limit to reducing the dimensions of the measuring element's suspensions. The suspension must be capable of carrying the measuring element, which may be a (metal) wire, measuring filaments, or a membrane that carries measuring elements.

Conventional approaches have attempted to compensate for changing ambient influences, such as ambient temperature, by additional measuring resistors in the electrical evaluation circuit to which the sensor is connected. Those approaches are, however, limited. Since the ambient influence on a Pirani sensor depends not only on the temperature but also on the pressure of the measured fluid, compensation by a temperature sensor is, strictly speaking, valid only for a single operating point.

SUMMARY

The present disclosure provides an improved fluid property sensor. The sensor is based on a measuring element which is sensitive to a thermal conductivity of a surround fluid. A signal is derived from the measuring element to determine a property of a fluid. The sensor substantially reduces parasitic heat loss through the measuring element's suspension and radiation heat losses from the measuring element. The reduced heat losses result in a reduced base power $P_{zero}$ and zero pressure $p_0$. The reduced base power $P_{zero}$ improves the signal to noise ratio of the sensor, and correspondingly the sensor's accuracy. The improved sensor also reduces or eliminates surface contamination of the measuring element, or reduces its effect on the measurement.

The disclosure further improves upon the applicant's disclosure in U.S. Pat. No. 9,606,074, which is hereby incorporated by reference in its entirety.

An improved fluid property sensor uses an electrically resistive measuring element which is disposed within a fluid. The measuring element is held by a suspension member and electrically connected to an evaluation circuit. A first heating element extends at least partially proximal to the measuring element and is electrically connected to a first power source. Depending on the type of sensor, the first heating element may be a filament heating element or a membrane heating element.

A processor is provided and operatively connected to the evaluation circuit. The processor is programmed to receive an input from the evaluation circuit and to calculate a property of the fluid in response to the received input. During a measurement, the first power source provides radiation loss compensation power to the first heating element which at least partially compensates parasitic radiative heat loss from the measuring element.

The improved fluid property sensor may in particular be a Pirani sensor, the fluid may be a gas, and the property of the fluid may be a vacuum pressure. Alternatively, the sensor may be a flow sensor and the property of the fluid may a flow rate.

The first power source may connected to the processor and the processor may be programmed to control the first power source to provide a calibrated radiation loss compensation power to the first heating element based on a first numerical calibration value stored in a non-volatile memory component.

The first heating element and the measuring element may be conductive traces disposed on a common substrate. Also, the first heating element and the measuring element may comprise segments which extend in parallel. More specifically, the first heating element and the measuring element may be conductive traces disposed on a common substrate comprising arc-shaped segments. The conductive traces may be made amorphous silicon (a-Si) disposed on a thin film membrane made of Si3N4 or made of nickel deposited on a thin film membrane made of silicon nitride (SixNy). The conductive traces and the thin film membrane may be formed as part of a MEMS device.

The measuring element may be a filament and the first heating element may be arranged near a mid-section of the filament.

The sensor may further include a second heating element which is thermally conductively connected to the suspension member and electrically connected to a second power source. In that case, the second power source may provide suspension loss compensation power to the second heating element. The suspension loss compensation power may be selected to at least partially compensate parasitic conductive heat loss from the measuring element into the suspension member. The first power source and the second power source may be independently controlled. More specifically, the first power source may controlled by the processor based on a first numeric value stored in a non-volatile memory and the second power source may be controlled by the processor based on a second numeric value stored in the non-volatile memory.

A method for measuring a property of a fluid may utilize the following steps:

Suspending a measuring element within the fluid. The measuring element may be held by a suspension member.

Providing a first heating element which extends at least partially proximal to the measuring element.

Applying a measuring power to the measuring element.

Applying a radiation loss compensation power to the first heating element. The radiation loss compensation power may be selected to at least partially compensate parasitic radiative heat loss from the measuring element.

Evaluating heat transfer from the measuring element into the fluid.

Deriving the property of the fluid.

The method may further utilize measuring an ambient temperature and selecting the radiation loss compensation power depending on the measured ambient temperature.

The method may utilize a second heating element which is thermally conductively connected to the suspension member and applying suspension loss compensation power to the second heating element. The suspension loss compensation power may be selected to at least partially compensate parasitic conductive heat loss from the measuring element into the suspension member.

When a second heating element is present, the method may include measuring an ambient temperature and selecting both the radiation loss compensation power and the suspension loss compensation power depending on the measured ambient temperature. The radiation loss compensation power and the suspension loss compensation power may be independently controlled.

To achieve optimal performance, a fluid property sensor may be calibrated using the following steps:

Suspending a measuring element within a fluid having a pressure of less than $10^{-6}$ mbar. The measuring element may be held by a suspension member.

Providing a first heating element which extends at least partially proximal to the measuring element.

Applying measuring power to the measuring element.

Applying radiation loss compensation power to the first heating element.

Increasing the radiation loss compensation power and evaluating a change of the measuring power.

Determining a calibrated radiation loss compensation power.

The method may further include storing a numerical value associated with the calibrated radiation loss compensation power in a non-volatile memory component.

When used with a sensor having a second heating element which is thermally conductively connected to the suspension member the method may further include these steps:

Applying suspension loss compensation power to the second heating element.

Increasing the suspension loss compensation power and evaluating a change of the measuring power.

Determining a calibrated suspension loss compensation power.

Storing a first numerical value associated with the calibrated radiation loss compensation power in a non-volatile memory component.

Storing a second numerical value associated with the calibrated suspension loss compensation power in the non-volatile memory component.

The radiation loss compensation power may be increased until no further reduction of the measuring power is observed, until the measuring power falls below a predetermined threshold, or until the rate of change of the measuring power falls below a predetermined threshold. The radiation loss compensation power may be increased until no further reduction of the measuring power is observed, until the measuring power falls below a predetermined threshold, or until the rate of change of the measuring power falls below a predetermined threshold.

The following detailed description is merely exemplary in nature and is not intended to limit the invention or the application and uses thereof. Furthermore, there is no intention to be bound by any theory presented in the preceding background or the following detailed description.

DETAILED DESCRIPTION

Figure 1A:
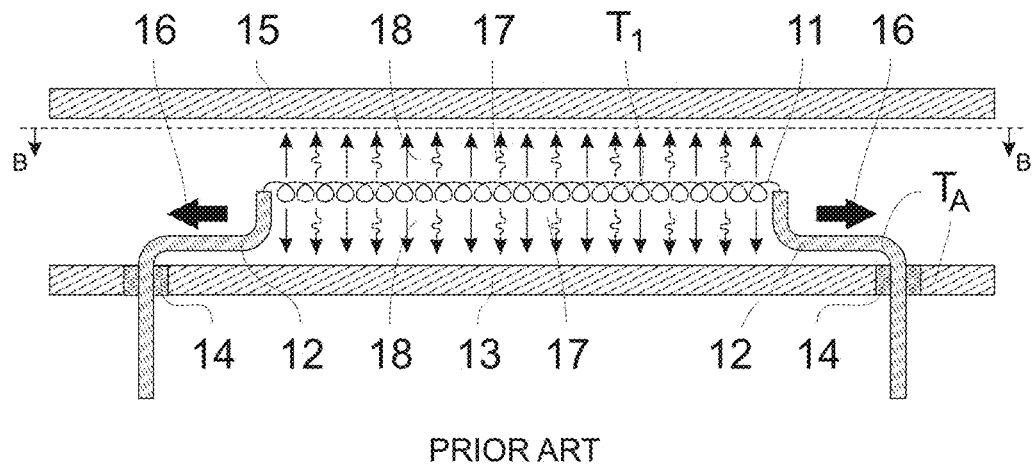
FIG. 1A is a side sectional view of a prior art Pirani sensor.
Figure 1B:
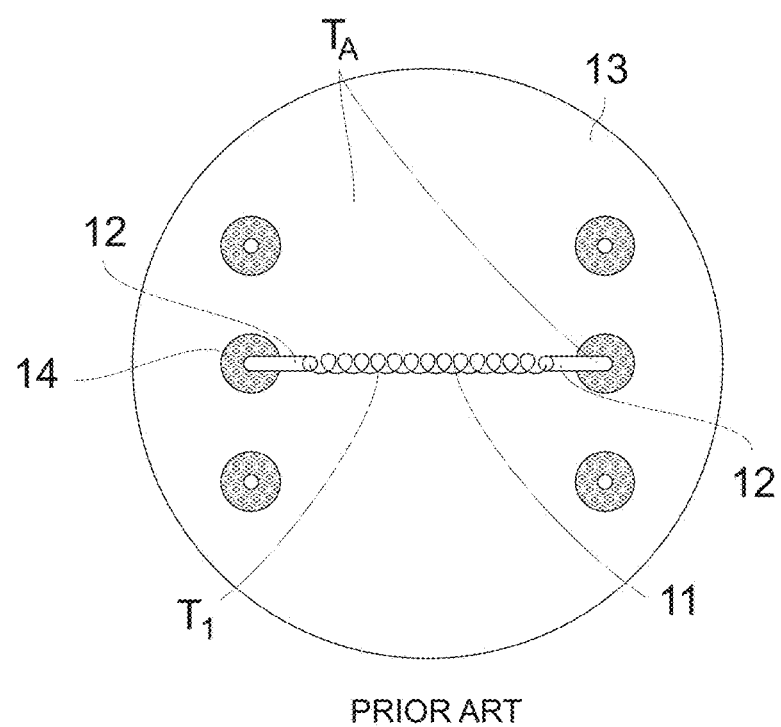
FIG. 1B is a top sectional view B-B of the sensor as in FIG. 1A.

Referring to FIG. 1A and FIG. 1B, a sectional side and a top view of a conventional Pirani vacuum sensor are shown. A measuring element 11 is suspended within a fluid. The measuring element 11 is a filament made of coiled metal wire. The measuring element 11 is held on both ends by suspension pins 12, which are electrically conductive. The suspension pins 12 reach through insulated bushings 14 in a base plate 13. The lower ends of the suspensions pins 12 reach outside the sensor and are used to electrically connect the measuring element 11 to an electric circuit. A heat sink 15 is positioned adjacent to the measuring element 11. The heat sink 15 may serve as a sensor cover.

During operation, the base plate 13 and the suspension pins 12 assume ambient temperature $T_A$. Through externally provided power the measuring element 11 is heated to a controlled temperature $T_1$. The measuring element 11 transfers heat into the surrounding fluid by thermal conduction. Fluid heat transfer 18 from the measuring element 11 to the heat sink 15 and the base plate 13 is illustrated by thin straight arrows. Heat transfer into the fluid is a signal, which can be used to determine properties of the fluid, e.g. the fluid's pressure, flow rate or composition. The measuring element 11 also conductively transfers heat into suspension pins 12. The suspension heat loss 16 is illustrated by bold arrows. The measuring element 11 further transfers heat into the cover 15 and the base plate 13 by radiation. This radiation heat loss 17 is indicated by wavy arrows.

Figure 2A:
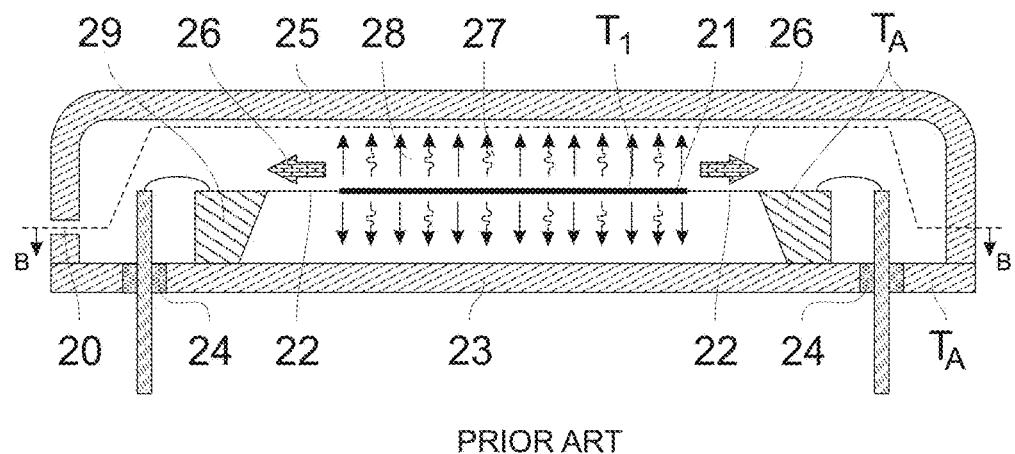
FIG. 2A is a side sectional view of a prior art micro-Pirani sensor.
Figure 2B:
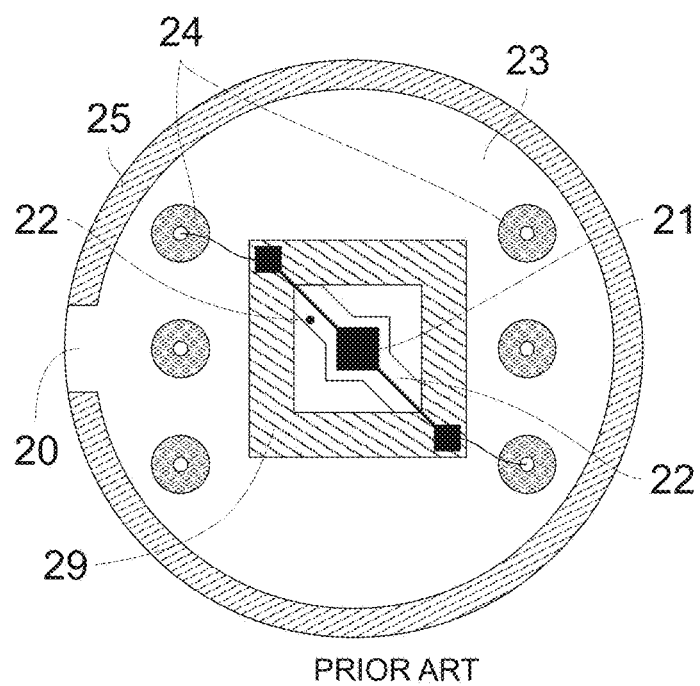
FIG. 2B is a top sectional view A-A of the sensor of as in FIG. 2A.

Referring now to FIG. 2A and FIG. 2B, a sectional side and top view of a conventional micro-Pirani vacuum sensor are shown. A thin micromachined membrane measuring element 21 is suspended in a fluid. The membrane measuring element 21 is connected by electrically and thermally conductive suspension leads 22 to a micro-Pirani chip 29. The micro-Pirani chip 29 is disposed on base plate 23. The membrane measuring element 21 is electrically connected to leads which lead through bushings 24 in the base plate 23. The micro-Pirani sensor is enclosed by a cover 25. The cover 25 has an opening 20 allowing fluid to enter and exit the sensor.

During operation, the base plate 23 and the cover 25 assume ambient temperature $T_A$. Through externally provided power the membrane measuring element 21 is heated to a controlled temperature $T_1$. The membrane measuring element 21 transfers heat into the surrounding fluid by thermal conduction. Fluid heat transfer 28 is illustrated by thin straight arrows. Heat transfer into the fluid is a signal, which can be used to determine properties of the fluid, e.g. the fluid's pressure, flow rate or composition. The membrane measuring element 21 also conductively transfers heat into suspension leads 22. Suspension heat loss 26 is illustrated by bold arrows. The membrane measuring element 21 further radiates heat into the cover 25 and the base plate 23. Radiation heat loss 27 is indicated by wavy arrows.

The prior art sensors of FIGS. 1 and 2, when used as a Pirani vacuum sensors, have a zero pressure corresponding to the sum of the suspension heat losses 16, 26 and the radiation heat losses 17, 27. Typically, the conductive heat loss 26 of a micro-Pirani sensor is lower than the conductive heat loss 16 of a larger filament-based Pirani sensor, and correspondingly the zero pressure of a micro-Pirani sensor as shown in FIG. 2 is lower than that of a larger Pirani sensor as shown in FIG. 1. The same applies to the base power when the sensors are used as fluid flow sensors.

Figure 3A:
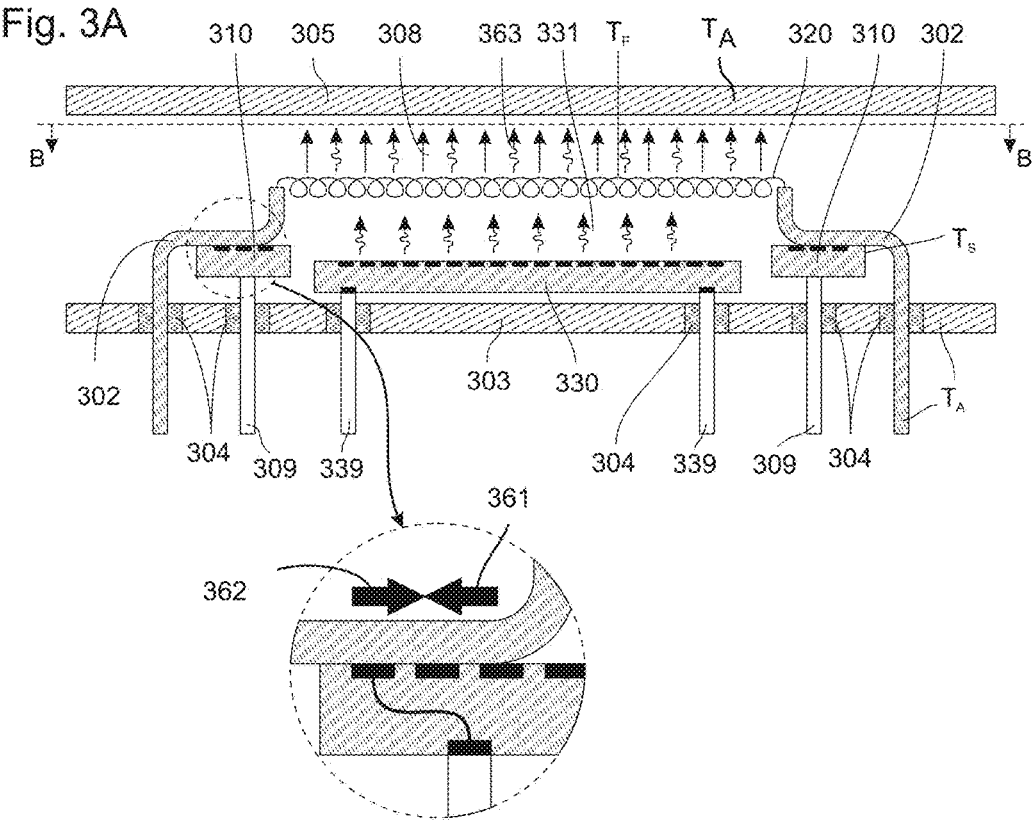
FIG. 3A is a side sectional view of a Pirani sensor with a filament heating element and suspension heating elements.
Figure 3B:
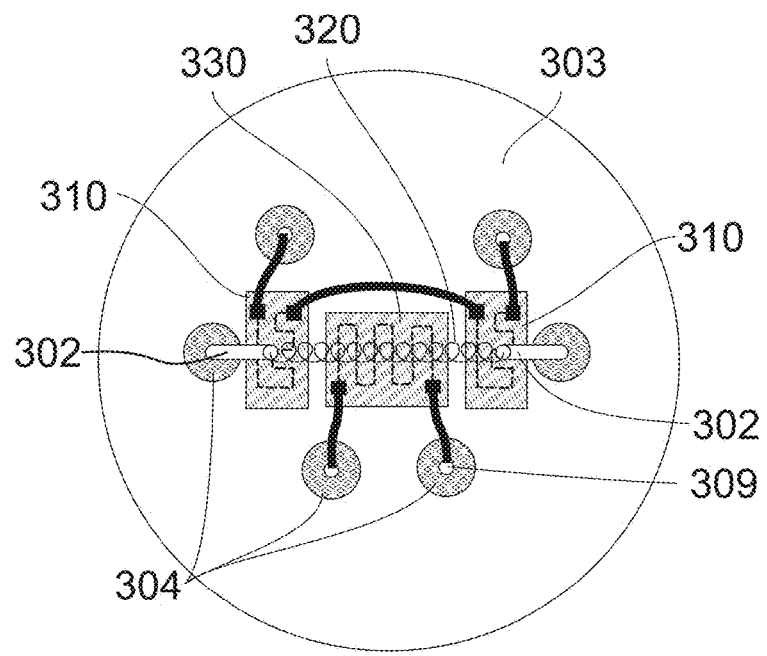
FIG. 3B is a top sectional view B-B of the sensor as in FIG. 3A.

FIG. 3A and FIG. 3B show an improved Pirani sensor based on the sensor shown in FIGS. 1A and 1B. A measuring element 320 is suspended within a fluid. The measuring element 320 is a filament made of coiled metal wire. The measuring element 320 is held on both ends by suspension pins 302, which are electrically conductive. The suspension pins 302 reach through insulated bushings 304 in a base plate 303. The lower ends of the suspensions pins 302 reach outside the sensor and are used to electrically connect the measuring element 320 to an electronic circuit. Positioned adjacent to the measuring element 320 is a heat sink 305. The heat sink 305 may be a cover which encloses the sensor and acts as a heat exchange surface. The heat sink 305 may be a tube within which the measuring element 320 extends longitudinally and through which a fluid flows.

A filament heating element 330 is disposed underneath the measuring element 320 without being in direct contact. The filament heating element 330 is electrically connected to electrical terminals 339 which reach through bushings 304 in the base plate 303. The filament heating element 330 extends, at least in parts, parallel to the measuring element 320. When in use, the filament heating element 330 is connected to a first power source and heated to a defined temperature. The filament heating element 330 causes heat 331 to radiate from the filament heating element 330 towards the measuring element 320 as illustrated by curly arrows. Heat 331 radiating from the first heating element 310 compensates at least a part of the heat 363 lost from the measuring element 320 through radiation. Radiative heat loss 363 from the measuring element 320 is symbolized by wavy arrows.

Separately from the filament heating element 330, suspension heating elements (second heating elements) 310 are provided and thermally conductively connected to the suspension pins 302. The suspension heating elements 310 are electrically connected to electrical terminals 309 which reach through bushings 304 in the base plate 303. The heating element 310 may dual-function as temperature sensors to measure the temperature of the suspension pins 302 and, for example, be a resistance thermometer (Pt100, Pt1000, Ni100, Ni1000). Two suspension heating elements 310 may be electrically connected in series. The suspension heating elements 310 may be electrically insulated from but mechanically directly connected to the suspension pins 302 to ensure good heat transfer from the suspension heating elements 310 into the suspension pins 302.

During operation, the base plate 303 and the lower ends of the suspension pins 302 assume ambient temperature $T_A$. Through externally provided power the measuring element 320 is heated to a controlled temperature $T_F$. The measuring element 320 transfers heat into the surrounding fluid by thermal conduction. Fluid heat transfer 308 is illustrated by thin straight arrows. Heat transfer 308 through the fluid occurs primarily between the measuring element 320 and the heat sink 305, which acts as a heat exchange surface. Heat transfer 308 through the fluid provides a signal, which can be used to determine properties of the fluid, e.g. the fluid's pressure, flow rate or composition. The measuring element 320 also conductively transfers heat into the suspension pins 302. Suspension heat loss 361 is illustrated by bold arrows. The measuring element 320 further transfers heat into the heat sink 305 and the base plate 303 by radiation. Radiation heat loss 363 is indicated by wavy arrows.

Externally provided power to the suspension heating element 310 through the electrical terminals 309 provides conductive heat loss compensation 362 which counteracts the conductive heat loss 361 into the suspension pins 302. The externally provided power to the suspension heating element 310 will also be referred to as suspension loss compensation power ($P_s$). The suspension loss compensation power is selected to at least partially replace the power otherwise discharged by thermal conduction of the suspension and thus minimize the base power and its adverse effect on measurement of the signal derived from the measuring element. The zero pressure of a Pirani measuring range can be significantly reduced, and the measuring range can be extended towards lower pressures.

Providing suspension compensation power through the suspension heating elements 310 alone does not provide complete elimination of heat losses from the measuring element 320. In particular, radiation heat loss 363 from the measuring element 320 can cause an undesirable uneven temperature distribution along the measuring element 320. For example, a measuring element 320 with suspension heat loss compensation may have a temperature of 80° C. near the suspension pins 302 and a temperature of 70° C. in a central section of the measuring element between the suspension pins 302. This is caused by a relatively high thermal resistance of the measuring element 320 which is typically a thin wire. To provide sufficient surface area with the surrounding fluid the measuring element 320 is relatively long and thin, which limits the amount of heat transfer from the suspension heating elements 310 into the center section of the measuring element 320.

A traditional Pirani sensor without heat loss compensation, when measuring a vacuum of $10^{-4}$ mbar, may operate with a measuring element voltage of about 300 mV and a measuring element current of about 2 mA. The measuring element hence experiences a total heat transfer of about 600 µW. Only 0.1% of this total heat transfer is typically caused by conductive heat transfer through the gas in the vacuum, and 99.9% of the heat is lost through the suspension and through radiation. The low signal portion of the total power which is measured limits the operating range of a traditional Pirani sensor. By applying compensation power to reduce suspension heat loss, the signal portion of the overall power applied to the measuring element can be significantly improved. By further applying compensation power to also compensate radiative heat loss the overall sensitivity of the Pirani sensor can be improved even further. This allows an extended measuring range of down to about $10^{-6}$ mbar. Generally speaking, if the suspension is at the same temperature as the measuring element, no heat flows from the measuring element into the suspension. The suspension may for example be two suspension pins 302, a bracket, or part of a microchip. Ideally, heat losses at the measuring element 320 will occur only through the thermal conductivity of the surrounding fluid, primarily in the direction of the heat sink 305. Heat losses through the suspension pin 302 and through radiation from the measuring element 320 have ideally been fully compensated.

Variation of a fluid's environmental conditions primarily influences heat flow through the suspension, and to a much lesser extent radiation losses. The ability to control and reduce suspension heat losses hence provides a significant improvement. However, when measuring very low pressures, variable radiation losses and deposits on the surface of a measuring element can still be disturbing. To minimize also the remaining environmental effect on the measurement noise, radiation losses can be reduced by providing a separate heating element which extends at least partially proximal to the measuring element. The separate heating element is preferably separately controlled from the suspension heating element. When in use, radiation loss compensation power is applied to the separate heating element and selected to at least partially compensate parasitic radiative heat loss from the measuring element.

The shape of the heat sink 305 is influenced by its functions as a heat exchange surface and cover to protect the measuring element 320 from damage and contamination. Due to the need of fluid (gas or liquid) exchange, the heat sink 305 may only inadequately protect the measuring element 320 against contamination. Nevertheless occurring contamination of the measuring element surface, for example due to condensation, can be partially eliminated by short-term heating of the measuring element 320 to a higher target temperature.

The inside surface of the heat sink 305 which is facing the measuring element 320 may be reflective. The inside surface of the heat sink 305 may for example be coated with a silver coating or made of polished stainless steel. Reflectivity in the infrared spectrum, in particular in the far infrared spectrum, reduces the overall power consumption of the sensor as radiation heat loss 363 from the measuring element 320 and heat 331 radiating from the first heating element 310 are reflected from the heat sink 305 onto the measuring element 320.

Figure 4A:
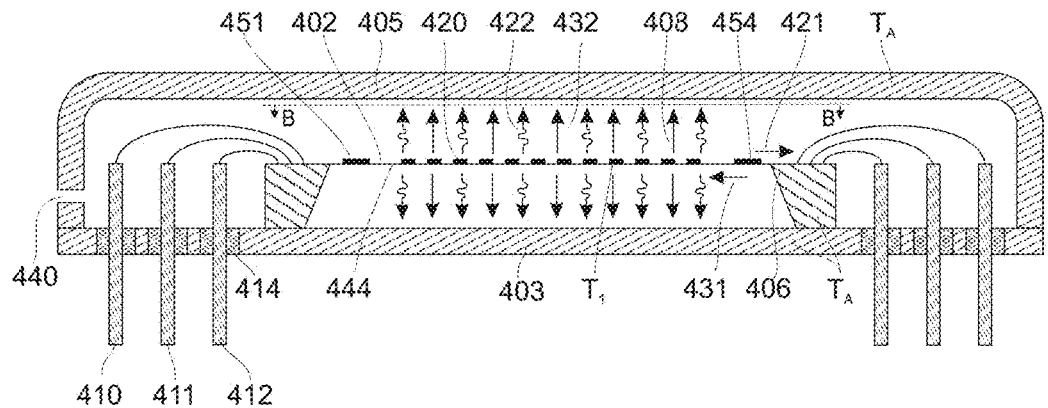
FIG. 4A is a side sectional view of a micro-Pirani sensor with a membrane heating element and suspension heating elements.
Figure 4B:
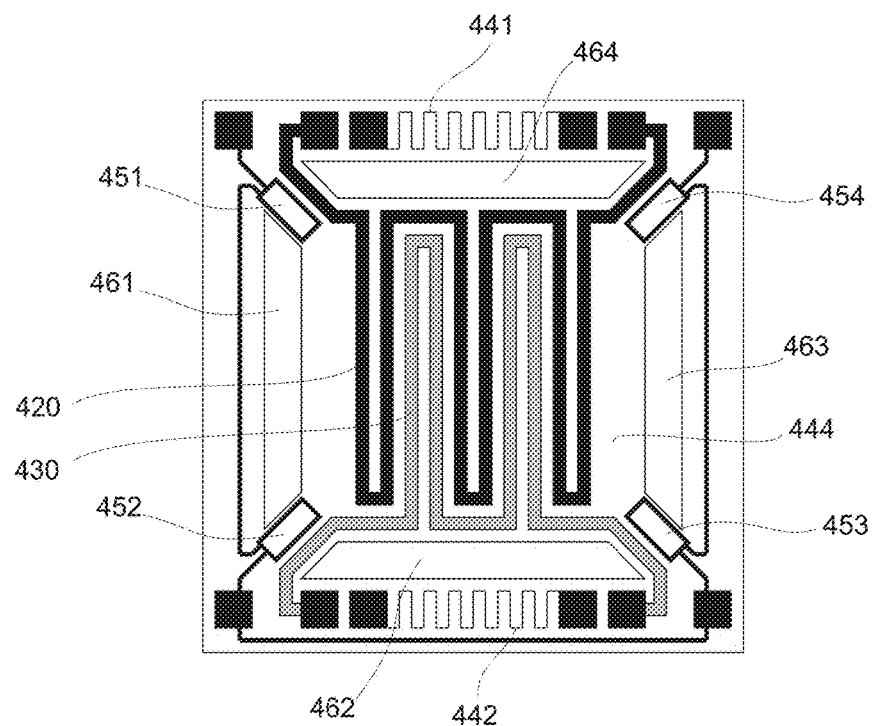
FIG. 4B is a top sectional view A-A of the sensor as in FIG. 4A.

FIG. 4A and FIG. 4B show an improved micro Pirani sensor based on the sensor shown in FIG. 2A and FIG. 2B. A thin micromachined measuring element 420 is disposed on a membrane 444 and suspended in a fluid. The membrane 444 is attached by suspension leads 402 to a micro Pirani chip 406. Openings 461,462,463,464 between the membrane 444 and the micro Pirani chip 406 minimize conductive heat losses from the membrane 444 and the measuring element 420 to the area of the suspension leads 402. The micro Pirani chip 406 is disposed on a base plate 403. The membrane measuring element 420 is electrically connected by bonding wires to leads 411 which lead through bushings 414 in the base plate 403. The micro-Pirani sensor is enclosed by a cover 405. The cover 405 has an opening 440 allowing fluid to enter and exit the sensor. The cover 405 also functions as a heat sink.

A membrane heating element 430 extends at least partially proximal to the measuring element 420. As shown, the membrane heating element 430 is applied to the membrane 444, i.e. the measuring element 420 and the membrane heating element 430 are disposed on a common substrate. The membrane heating element 430 and the measuring element 420 comprise sections which extend in parallel. More specifically, both the membrane heating element 430 and the measuring element 420 are shown to form a double-meandering shape. The close proximity of the membrane heating element 430 and the measuring element 420 provide for a beneficial even temperature distribution along the entire length of the measuring element while in use. Radiation heat loss 422 from the measuring element 420 is compensated by heat transfer from the membrane heating element 430 into the measuring element 420, primarily through conductive heat transfer through the membrane 444.

Suspension heating elements 451,452,453,454 are disposed on the suspension leads 402 and electrically connected to terminals 412 which reach through bushings 414 in the base plate 403. As shown, one heating element 451,452,453,454 is placed on each corner of the suspensions leads 402 that hold the membrane 444 and the measuring element 420 which is disposed thereon. All suspension heating elements 451,452,453,454 are internally wired in series and connected to terminals 412. Alternatively, two or more of the suspension heating elements could be wired in parallel.

Resistive temperature sensors 441,442 are provided along the outer edges of the membrane 444 where the membrane 444 is attached to the micro Pirani chip 406. The temperature sensors 441,442 are positioned so as to assume the ambient temperature of the micro Pirani chip 406.

During operation, the base plate 403, the micro Pirani chip 406 and the cover 405 assume ambient temperature $T_A$. Through externally provided power the membrane measuring element 420 is heated to a controlled temperature $T_1$. The membrane measuring element 420 transfers heat into the surrounding fluid by thermal conduction. Fluid heat transfer 408 is illustrated by thin, straight, vertical arrows. Heat transfer 408 into the fluid provides a signal, which can be used to determine properties of the fluid, e.g. the fluid's pressure. The membrane measuring element 420 also conductively transfers heat into the suspension leads 402. Suspension heat loss 421 is illustrated by an outwardly facing horizontal arrow. The membrane measuring element 420 further radiates heat into the cover 405 and the base plate 403. Radiation heat loss 422 is indicated by a wavy arrow.

Externally provided power to the suspension heating elements 451,452,453,454 through the electrical terminals 412 provides suspension heat loss compensation 431 which counteracts the conductive heat loss 421. In sum, no conductive heat is lost through the suspension leads 402. Alternatively, conductive heat loss through the suspension leads 402 is at least partially compensated by the suspension loss compensation power that is applied to the suspension heating elements 451,452,453,454.

Power applied through the electrical terminals 410 to the membrane heating element 430 which extends proximal to the measuring element 420 provides radiation heat loss compensation which counteracts the radiation heat loss 422. Ideally, the radiative heat loss 422 from the measuring element 420 is completely compensated by radiation heat loss compensation power applied to the membrane heating element 430. In practice, radiative heat loss 422 from the measuring element 420 is at least partially compensated by radiation heat loss compensation power applied to the membrane heating element 430.

Figure 5:
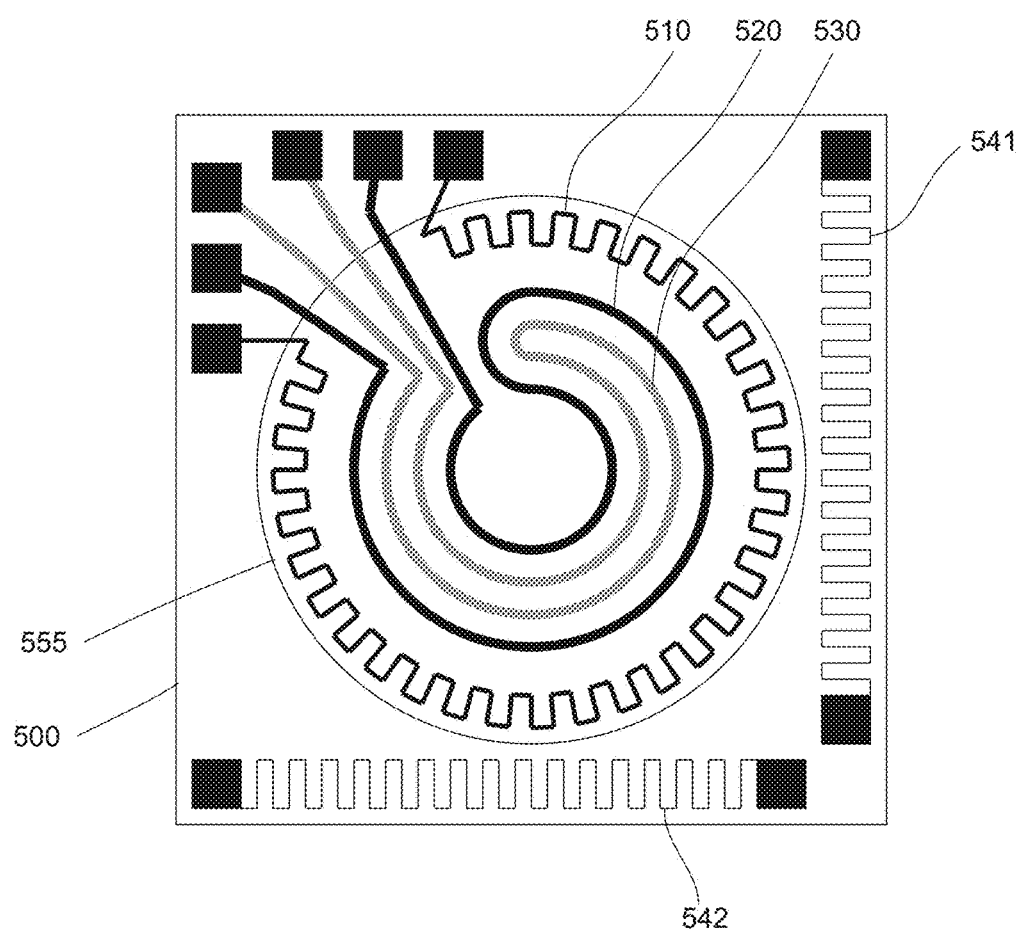
FIG. 5 is a top sectional view of an alternative micro-Pirani sensor with a membrane heating element and a suspension heating element.

FIG. 5 shows an alternative shape of a measuring element 520 disposed on a circular, disk-shaped membrane 555. Here, the measuring element 520 assumes the shape of two connected, arc-shaped segments which surround a similarly shaped membrane heating element 530. The membrane heating element 530 and the measuring element are electrically conductive traces disposed on a common substrate. Arranged outwardly of the measuring element 520 and the membrane heating element 530 is a suspension heating element 510 which extends along the outer edge of the membrane 555. Ambient temperature sensing elements 541, 542 are provided on the micro Pirani chip 500 outwardly of the membrane 555 so as to assume the ambient temperature of the micro Pirani chip.

Figure 6:
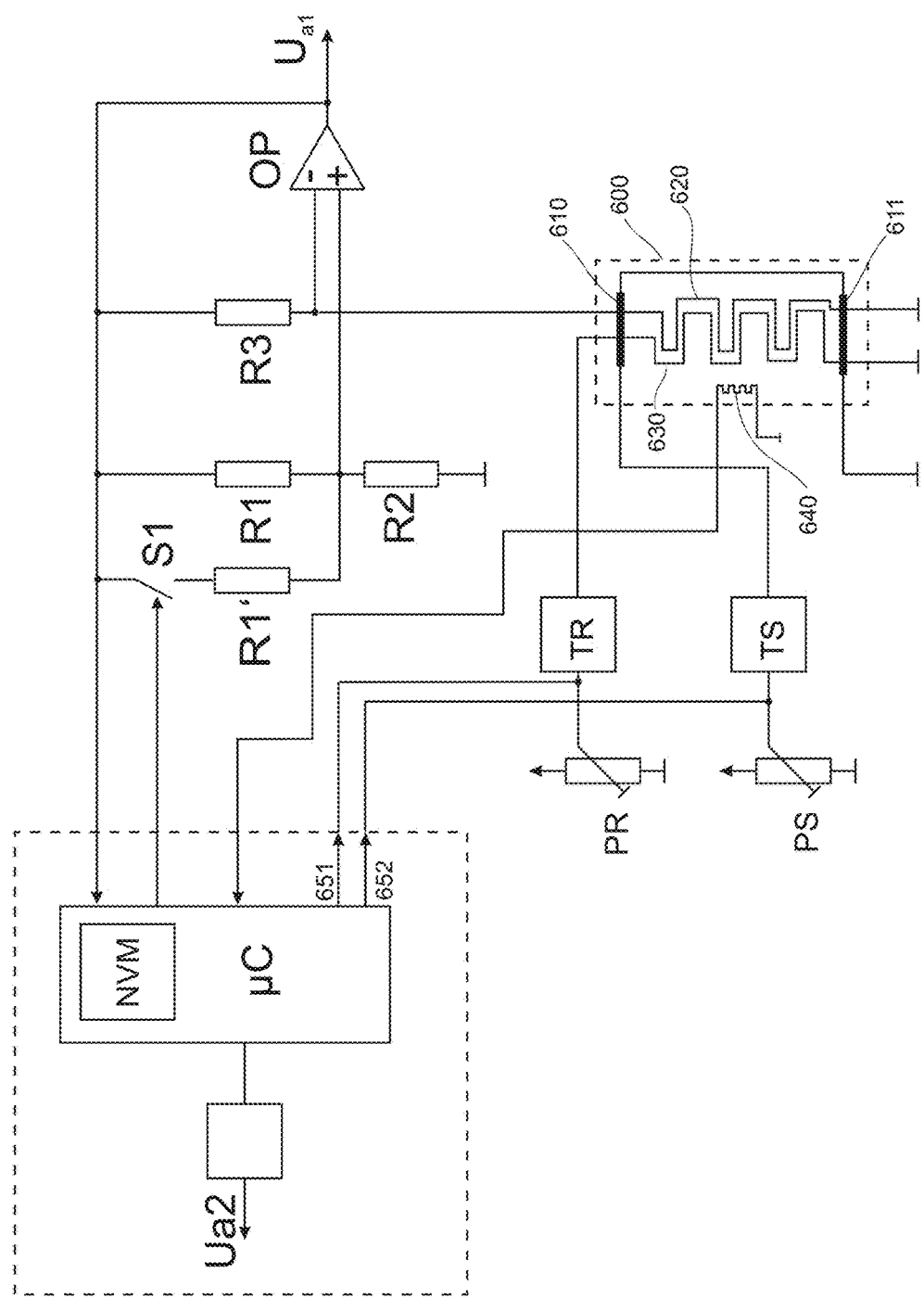
FIG. 6 shows an electronic circuit for operating a fluid sensor with independent radiation heat loss compensation and suspension heat loss compensation.

FIG. 6 illustrates an electronic circuit suitable for connecting a sensor as in FIG. 3A/B, FIG. 4A/B and FIG. 5. The measuring element 620 is connected within a Wheatstone bridge circuit with resistors R1, R2 and R3. Preferably, the Wheatstone bridge is symmetrical with R1=R2. The voltage across the bridge is amplified by an operational amplifier OP to level $U_{a1}$ and fed into a processor µC. $U_{a1}$ is a measure of the heat loss in the measuring element 620, and can be used to derive a fluid property such as fluid vacuum pressure by further processing in the processor µC.

A heating element 630 is provided to compensate radiation heat loss of the measuring element 620. The heating element 630 may be a filament heating element or a membrane heating element. The heating element 630 is connected to a radiation loss controller TR. The radiation loss controller TR controls the heating element 630 while in use. The radiation loss controller TR may be a temperature controller, a voltage controller, a current controller, or a power controller. The radiation loss controller TR may be connected to a potentiometer PR which allows setting a predetermined temperature, a predetermined voltage, a predetermined current, or a predetermined power. The radiation loss controller TR may be an analog circuit providing an adjustable constant voltage or an adjustable constant current to the heating element 630. Alternatively, the radiation loss controller TR may be connected to and controlled by the processor µC. The processor may provide a signal to the radiation loss controller TR which the controller converts into a target voltage, a target current, a target temperature or a target power to supply the heating element 630. The signal may e.g. be a serial data message or a pulse-width-modulated signal having an adjustable duty cycle. Many alternative electronic circuits are known to provide regulated voltage or current output that may be used to form the radiation loss controller TR. Also, many alternative electronic circuits are known to provide regulated temperature control of a resistive heater or power control of a resistive load that may be applied to form the radiation loss controller TR. When connected to the processor µC the target temperature of the heating element 630, which correlates to the output of the radiation loss controller TR, may be based on a numerical value stored in a non-volatile memory within or connected to the processor µC. Alternatively, the target voltage applied to the heating element 630 or the target current flowing through the heating element 630 or the target power applied to the heating element 630 by the radiation loss controller TR, may be based on a numerical value stored in a non-volatile memory within or connected to the processor µC. More generally, the radiation loss controller TR is a power source applying power to the heating element 630.

Two suspension heating element 610,611 are provided to compensate heat losses through the suspension elements. As shown, the suspension heating elements 610, 611 are connected in series to a suspension loss controller TS. The suspension loss controller TS is operatively connected to the processor µC or to a potentiometer PS. The suspension loss controller TS may be of the same kind as the radiation loss controller TR. Generally, the suspension loss controller TS is a power source providing power to the suspension heating elements 610,611. Preferably, the suspension loss controller TS and the radiation loss controller TR are independently adjustable. When connected to the processor µC the output of the radiation loss controller TR may be adjusted based on a first numeric value stored in a non-volatile memory NVM whereas the output of the suspension loss controller TS may be adjusted based on a second numeric value stored independently in a separate memory location in the non-volatile memory NVM.

Preferably, a sensor should be calibrated to allow operation at peak performance. In general, calibration can be used to maximize the signal to noise ratio of the sensor, in particular when operating near the lower end of its measuring range. Calibration may be used to minimize base power $P_{zero}$ and zero pressure $p_0$. The reduced base power $P_{zero}$ improves the signal to noise ratio of the sensor, and correspondingly the sensor's accuracy. An exemplary Pirani vacuum sensor may e.g. have a lower measuring range of about $10^{-6}$ mbar. That is, the sensor may not be capable to sense pressure differences below $10^{-6}$ mbar due to noise. During calibration, the sensor is preferably exposed to an environment below its measurement range. An exemplary vacuum sensor may thus be exposed to a gas having a pressure of less than $10^{-6}$ mbar, for example to a gas having a pressure of $10^{-7}$ mbar or even $10^{-8}$ mbar. In practice, using a calibration pressure that is $\frac{1}{10}^{th}$ of the lower end of the sensor's measuring range has proven to be adequate.

Referring to FIG. 6, the sensor 600 can be calibrated by minimizing the output voltage $U_{a1}$ of the operational amplifier OP while the measuring element 620 is exposed to a high or an ultra-high vacuum. As shown, the output of the operational amplifier feeds the Wheatstone bridge made of R1,R2,R3 and the measuring element 620. The measuring element 620 has a positive temperature coefficient, i.e. its resistance $R_{620}$ increases with its temperature. Electric current flowing through the measuring element causes the measuring element 620 to heat up, thereby increasing its resistance. In a steady state, the output $U_{a1}$ of the operational amplifier OP is a signal indicating how much heat is transferred out of the measuring element into the environment. While exposed to a vacuum pressure below the sensor's measuring range, any heat transferred out of the measuring element 620 can be assumed to be noise caused by radiative heat loss or suspension heat losses.

The potentiometer PR, or alternatively a processor μC output 651 which is connected to radiation loss controller TR, may be used to adjust the temperature of the heating element 630 which extends at least partially proximal to the measuring element 620. As the temperature of the heating element 630 is raised, a corresponding drop in the voltage $U_{a1}$ may be observed. This is at least partially due to heat from the heating element 630 increasingly compensating radiation heat losses out of the measuring element 620. The compensation power applied to the heating element 630 may be increased until the voltage $U_{a1}$ or its rate of change fall below a predetermined threshold.

In a separate step the potentiometer PS or alternatively a processor μC output 652 which is connected to suspension loss controller TS, may be used to adjust the temperature of the suspension heating elements 610,611. As the temperature of the suspension heating element 610,611 is raised, a corresponding drop in the voltage $U_{a1}$ may be observed. This is at least partially due to heat from the suspension heating elements 610,611 increasingly compensating suspension heat losses. The compensation power applied to the suspension heating elements 610,611 may be increased until the voltage $U_{a1}$ or its rate of change fall below a predetermined threshold.

Using two independently controllable heating elements 630 and 610,611 allows a fine-tuning of the sensor's base power $P_{zero}$ and zero pressure $p_0$ not previously available. Advantageously, the heating elements 630,610,611 may be calibrated at two different operating temperatures of the heating element. A switch S1 is provided to connect a parallel resistor R1' in parallel with the first Wheatstone resistor R1. The switch S1 is preferably connected to and controlled by the processor μC. The switch S1 may e.g. be a relay. When the switch S1 is open, the Wheatstone bridge will assume a steady state when $R1/R2=R3/R_{620}$ with $R_{620}$ being the resistance of the measuring element 620 at a first operating temperature. When the switch S1 is closed, the Wheatstone bridge will assume a steady state when $(R1\|R1')/R2=R3/R_{620'}$ with $R_{620'}$ being the resistance of the measuring element 620 at a second operating temperature. $R1\|R1'$ denotes the parallel resistance of R1 and R1'.

The switch S1 is selectively opened and closed to operate the measuring element 620 at two different temperatures. For example, the resistors R1,R2,R3 may be selected such that the measuring element 620 assumes a first steady state temperature of 80° C. when the switch S1 is open. The resistor R1' may be selected such that when the switch S1 is closed the measuring element 620 assumes a second steady state temperature of 120° C. Typically, the measuring element 620 of a filament based Pirani sensors may have a resistance of about 70-100Ω. The measuring element 620 of a micro-Pirani sensor may have a resistance of about 1-1.3 kΩ.

Calibration may be performed with the switch S1 being open and the measuring element operating at it first operating temperature of 80° C. The ambient temperature may be selected to be a room temperature of 20° C. Under these conditions the radiation loss controller TR and the suspension loss controller TS may be adjusted until the amplifier output voltage Ua1 is minimized. Preferably, the radiation loss controller TR and the suspension loss controller TS are controlled by the processor μC which may be programmed to execute a calibration routing automatically. That is, the processor μC may be programmed to cause the radiation loss controller TR to increase power applied to the heating element 630 until the output voltage of the amplifier OP or its rate of change falls below a first predetermined threshold. The processor μC may then store a numerical value $cal_{TR}$ associated with the calibrated radiation loss compensation power in a non-volatile memory component NVM. Next, the processor μC may be programmed to cause the suspension loss controller TS to increase power applied to the suspension elements 610,611 until the output voltage of the amplifier OP or its rate of change falls below a second predetermined threshold. The processor μC may then store a numerical value $cal_{TS}$ associated with the calibrated suspension loss compensation power in a non-volatile memory component NVM. The order in which the two compensation powers are calibrated may be reversed, i.e. the processor μC may be programmed to calibrate the suspension loss compensation before calibrating the radiation loss compensation.

When in use, the sensor may be exposed to a wide range of ambient temperatures, e.g. to sense fluid pressure or fluid flow of fluids having various temperatures. Therefore, the measuring element 620 may be operated at different temperatures based on an application environment. The measuring element 620 temperature and the ambient temperature affect the radiation heat losses and suspension heat losses. The processor μC, and more specifically a non-volatile memory NVM therein, may comprise additional compensation data to adjust the suspension loss controller TS and the radiation loss controller TR based on an ambient temperature. The additional compensation data may be based on experiments conducted with a reference sensor in a lab environment and need not be calibrated for each production sensor.

In an exemplary use case the processor μC may utilize an input from an ambient temperature sensing element 640 which is part of the sensor 600 to control radiation loss controller TR. An output 651 of the processor μC that is connected to the radiation loss controller TR may be selected based on both a numerical calibration value $cal_{TR}$ stored in a non-volatile memory NVM and on a look-up value associating the ambient temperature with a further radiation power compensation value.

Similarly, the processor μC may utilize the ambient temperature input to control the suspension loss controller TS. An output 652 of the processor μC that is connected to the suspension loss controller TS may be selected based on both a numerical calibration value $cal_{TS}$ stored in a non-volatile memory NVM and on a look-up value associating the ambient temperature with a further suspension power compensation value.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A method for measuring a property of a fluid, comprising:
suspending a measuring element within the fluid, the measuring element being held by a suspension member;
providing a first heating element which extends at least partially proximal to the measuring element;
applying measuring power to the measuring element;
applying radiation loss compensation power to the first heating element, the radiation loss compensation power being selected to at least partially compensate parasitic radiative heat loss from the measuring element;
providing a second heating element which is thermally conductively connected to the suspension member;
applying suspension loss compensation power to the second heating element, the suspension loss compensation power being selected to at least partially compensate parasitic conductive heat loss from the measuring element into the suspension member
evaluating heat transfer from the measuring element into the fluid; and
deriving the property of the fluid.

2. The method as in claim 1, further comprising:
measuring an ambient temperature; and
selecting the radiation loss compensation power depending on the measured ambient temperature.

3. The method as in claim 1, further comprising:
measuring an ambient temperature; and
selecting the radiation loss compensation power and the suspension loss compensation power depending on the measured ambient temperature.

4. The method as in claim 1, wherein the radiation loss compensation power and the suspension loss compensation power are independently controlled.

5. A method for calibrating a fluid property sensor, comprising:
suspending a measuring element within a fluid having a pressure of less than $10^{-6}$ mbar, the measuring element being held by a suspension member;
providing a first heating element which extends at least partially proximal to the measuring element;
applying a measuring power to the measuring element;
applying a radiation loss compensation power to the first heating element;
increasing the radiation loss compensation power and evaluating a change of the measuring power;
determining a calibrated radiation loss compensation power;
providing a second heating element which is thermally conductively connected to the suspension member;
applying a suspension loss compensation power to the second heating element;
increasing the suspension loss compensation power and evaluating a change of the measuring power; and
determining a calibrated suspension loss compensation power.

6. The method as in claim 5, further comprising:
storing a numerical value associated with the calibrated radiation loss compensation power in a non-volatile memory component.

7. The method as in claim 5, further comprising:
storing a first numerical value associated with the calibrated radiation loss compensation power in a non-volatile memory component and
storing a second numerical value associated with the calibrated suspension loss compensation power in the non-volatile memory component.

8. The method as in claim 5, wherein the radiation loss compensation power is increased until the measuring power falls below a predetermined threshold or until a rate of change of the measuring power falls below a predetermined threshold.

9. A fluid property sensor, comprising:
an electrically resistive measuring element disposed within a fluid, the measuring element being held by a suspension member and electrically connected to an evaluation circuit;
a first heating element which extends at least partially proximal to the measuring element, the first heating element being electrically connected to a first power source;
a second heating element which is thermally conductively connected to the suspension member and electrically connected to a second power source; and
a processor operatively connected to the evaluation circuit,
wherein the processor is programmed to receive an input from the evaluation circuit and to calculate a property of the fluid in response to the received input,
wherein the first power source provides radiation loss compensation power to the first heating element which at least partially compensates parasitic radiative heat loss from the measuring element, and
wherein the second power source provides suspension loss compensation power to the second heating element, the suspension loss compensation power being selected to at least partially compensate parasitic conductive heat loss from the measuring element into the suspension member.

10. The fluid property sensor as in claim 9, wherein the sensor is a Pirani sensor, the fluid is a gas, and the property of the fluid is vacuum pressure.

11. The fluid property sensor as in claim 9, wherein the sensor is a flow sensor and the property of the fluid is a flow rate.

12. The fluid property sensor as in claim 9, wherein the first power source is connected to the processor and wherein the processor is programmed to control the first power source to provide a calibrated radiation loss compensation power to the first heating element based on a first numerical calibration value stored in a non-volatile memory component.

13. The fluid property sensor as in claim 9, wherein the first heating element and the measuring element are conductive traces disposed on a common substrate and wherein the first heating element and the measuring element comprise segments which extend in parallel.

14. The fluid property sensor as in claim 9, wherein the first heating element and the measuring element are conductive traces on a common substrate comprising arc-shaped segments.

15. The fluid property sensor as in claim 9, wherein the measuring element is a filament and wherein the first heating element is arranged near a mid-section of the filament.

16. The fluid property sensor as in claim 9, wherein the first power source and the second power source are independently controlled.

17. The fluid property sensor as in claim 9, wherein the first power source is controlled by the processor based on a first numeric value stored in a non-volatile memory and wherein the second power source is controlled by the processor based on a second numeric value stored in the non-volatile memory.

18. The fluid property sensor as in claim 9, further comprising a heat sink having an inner surface facing the measuring element, the inner surface being infrared reflective.

* * * * *